US006728630B1

(12) United States Patent
Burt et al.

(10) Patent No.: US 6,728,630 B1
(45) Date of Patent: Apr. 27, 2004

(54) METHOD FOR PROVIDING ROUTE INSTRUCTIONS TO A MOBILE VEHICLE

(75) Inventors: Wylie Burt, Ypsilanti, MI (US); Jeffrey M. Stefan, Clawson, MI (US); Larry Tretyak, Highland, MI (US); Nicholas E. Govas, Clarkston, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/093,143

(22) Filed: Mar. 7, 2002

(51) Int. Cl.[7] .......................... G06G 7/78; G06F 165/00

(52) U.S. Cl. ........................ 701/202; 701/200; 340/988

(58) Field of Search ................................ 701/200–213, 701/117–119, 202; 340/988–995

(56) References Cited

U.S. PATENT DOCUMENTS 5,793,631 A * 8/1998 Ito et al. .................. 364/449.5
6,314,369 B1 * 11/2001 Ito et al. ..................... 701/209
6,317,684 B1 * 11/2001 Roeseler et al. ............ 701/202
6,339,746 B1 * 1/2002 Sugiyama et al. .......... 701/209
6,341,255 B1 * 1/2002 Lapidot ...................... 701/209
6,427,117 B1 * 7/2002 Ito et al. ..................... 701/209

* cited by examiner

*Primary Examiner*—Tan Q. Nguyen
*Assistant Examiner*—Dalena Tran
(74) *Attorney, Agent, or Firm*—Anthony Luke Simon

(57) ABSTRACT

The invention provides a method of providing route instructions to a mobile vehicle. A communication channel may be established between a client vehicle and a server. The server may be provided the location of the vehicle and it's destination. The server may calculate a route to reach the destination and store the route. One or more maneuver instructions may be downloaded to the vehicle, and the communication channel may then be terminated until the vehicle requires more maneuver instructions. A communication channel may then be reestablished between the vehicle and server and more maneuver instructions may be downloaded to the vehicle.

21 Claims, 5 Drawing Sheets

100

200

METHOD FOR PROVIDING ROUTE INSTRUCTIONS TO A MOBILE VEHICLE

FIELD OF THE INVENTION

In general, the invention relates to vehicle navigation. More specifically, the invention relates to a method of providing a vehicle with a travel route and in particular, to a method for enabling interruption of communication with the vehicle, and enabling communication to be resumed at a later time.

BACKGROUND OF THE INVENTION

Current vehicle route instruction generation methods require a known current location of a vehicle as well as a desired destination. Computer algorithms may use these two points to search map databases for the best route and generate a list of maneuvers required to reach the destination. The maneuver list may then be output to a user.

The map databases may change and algorithms to search the databases may improve over time. For convenience, the databases and algorithms may be maintained at a central server. The vehicle's location and destination may be uploaded to the server, and the route and maneuver list may be computed and transmitted back to the vehicle. Routes that are long or complicated would require the communication channel between the vehicle and server be open for an extended period of time. In such circumstances, this would needlessly tie up the communication channel between the server and other vehicle clients.

It would be desirable, therefore, to provide a method and system that overcomes these and other disadvantages.

SUMMARY OF THE INVENTION

One aspect of the invention provides a method for providing route instructions to a mobile vehicle. This method may include establishing communication between a client vehicle and a server and providing the server with the vehicle's current location and destination. The server may then calculate and store a route for the vehicle to traverse. Next, a number of maneuver instructions associated with the route may be downloaded to the vehicle. Communication between the vehicle and server may then be terminated until the vehicle has traversed a specified portion of the route downloaded to the vehicle. Then communication may be reestablished between the vehicle and server in order to download more maneuver instructions.

Another aspect of the invention provides a method for the client vehicle to provide the server with a client vehicle ID.

Another aspect of the invention provides a method for designating the route stored on the server as being in progress.

Another aspect of the invention provides a system for providing route instructions to a mobile vehicle. This system includes means for establishing and terminating communication between a vehicle and a server. The system also includes means for providing the server with the vehicle's current location and destination. The system also includes means for determining a route for the vehicle and storing the route on the server. Furthermore, this system includes means for downloading at least one maneuver instruction associated with the route to the vehicle.

Another embodiment of the invention provides a system with means for providing the server with a client vehicle ID. The system also provides means to store the route on the server.

A further aspect of this invention provides a computer usable medium for providing route instructions to a mobile vehicle. This computer usable medium includes computer readable code to receive a current location and destination of a client vehicle at the server, determine a route based on the vehicle's current location and destination, and receive at least one maneuver associated with the route at the client vehicle. Another aspect of this computer usable medium provides computer readable code to receive a client vehicle ID at the server and store the route associated with the client vehicle ID on the server. Another aspect of this computer usable medium comprises computer readable code to designate the route as in progress.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF A PREFERRED EMBODIMENT

Figure 1:
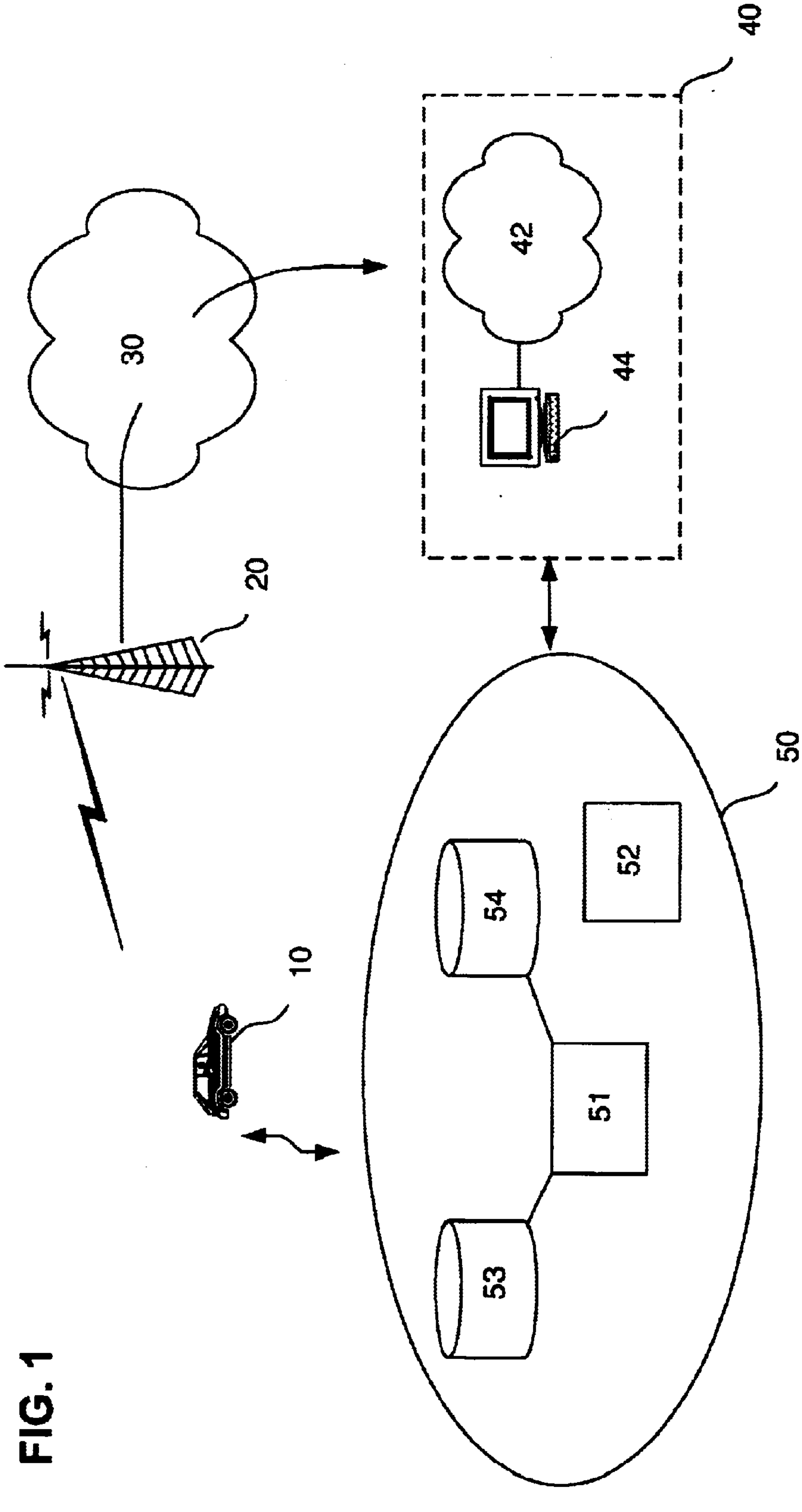
FIG. 1 is a schematic diagram of a system for generating navigation information for a vehicle in accordance with the present invention.

FIG. 1 shows one embodiment of a system for providing services to a vehicle in accordance with the present invention at 100. The system 100 may include one or more vehicle clients 10, one or more carrier systems 20, one or more communication networks 30, one or more service management subsystems 40 and one or more navigation subsystems 50. The service management subsystems may comprise one or more service management applications 42 and one or more service managers 44. The navigation subsystems 50 may comprise one or more route applications 51, 52, and one or more coordinate databases 53, 54.

Navigation subsystem 50 is a system for generating routes to be delivered to vehicle client 10 and for receiving route information from vehicle client 10. Navigation subsystem 50 may be connected with or in communication with service management subsystem 40. Service management subsystem 40 may be used to manage the delivery of information to or from navigation subsystem 50 or to other parts of system 100. Routes may be delivered or information may be received via a live agent, such as a human advisor, or via a virtual agent, such as an interactive computer program.

Navigation subsystem 50 may be any suitable hardware or software configuration, or combination of hardware and software that is configured to generate a route, process route information or receive information from vehicle client 10. In one embodiment of the invention, navigation subsystem 50 comprises one or more route applications 51, 52 and one or more coordinate databases 53, 54. For example, route applications 51, 52 may be any suitable software application for generating route information or otherwise processing route information. Coordinate databases 53, 54 may be any suitable databases for storing route information, such as location coordinates.

Vehicle client 10 may be any suitable vehicle. For example, the vehicle may bean automobile or a passenger-carrying unit such as a bus or train. Alternatively, vehicle client 10 may be an occupant of the vehicle or any suitable client device contained in the vehicle. In one embodiment of the invention, vehicle client 10 is a mobile or portable device equipped to communicate with service management subsystem 40.

Carrier system 20 is any suitable system for transmitting a signal from vehicle 10 to service management subsystem 40. Carrier system 20 may also transmit a signal from service management subsystem 40 to vehicle client 10. In one embodiment of the invention, carrier system 20 is a wireless carrier system as is well known in the art. Carrier system 20 may be, for example, a transmitter/receiver unit attached to vehicle client 10. Alternatively, carrier system 20 may be a separate transmitter/receiver carried by vehicle client 10.

Communication network 30 is any suitable system for communicating between vehicle client 10 and service management subsystem 40. In one embodiment of the invention, communication network is a public switched telephone network (PSTN). Alternatively, communication network 30 may be a multiprotocol Internet or intranet capable of transmitting voice and/or data in either analog or digital form or a combination of both. Alternatively, communication network 30 may be a hybrid communication network or virtual network.

Service management subsystem 40 is a system for managing a variety of services to be delivered to or from vehicle client 10. In one embodiment of the invention, service management subsystem 40 manages services that are distributable over a variety of channels. For example, services may be delivered via a live agent, such as a human advisor, or via a virtual agent, such as an interactive computer program. The structure of service management subsystem 40 may enable services to be delivered in a uniform manner regardless of the channel used for delivery or of the service being delivered. Service management subsystem 40 may maintain a consistent subscriber experience and "look and feel" across the products being delivered across the service distribution channels enabled.

Service management subsystem 40 may be any suitable hardware or software configuration, or combination of hardware and software that is configured to standardize each service being delivered via the subsystem 40 and to standardize each channel of delivery. In one embodiment of the invention, service management subsystem 40 standardizes each service and channel using personalization information from vehicle client 10. Thus, service management subsystem 40 may have a common profile mechanism across the services being delivered independent of the service distribution channel (live agent, virtual agent, web channel, speech channel) and of the service (news, weather, sports, stocks, navigation instructions, etc.). In one embodiment of the invention, service management subsystem includes one or more application components 42 and one or more service managers 44. For example, application 42 may be any suitable software application for managing one or more services. Service managers 44 may be any suitable hardware and/or software configuration or structure for executing applications 42.

Figure 2:
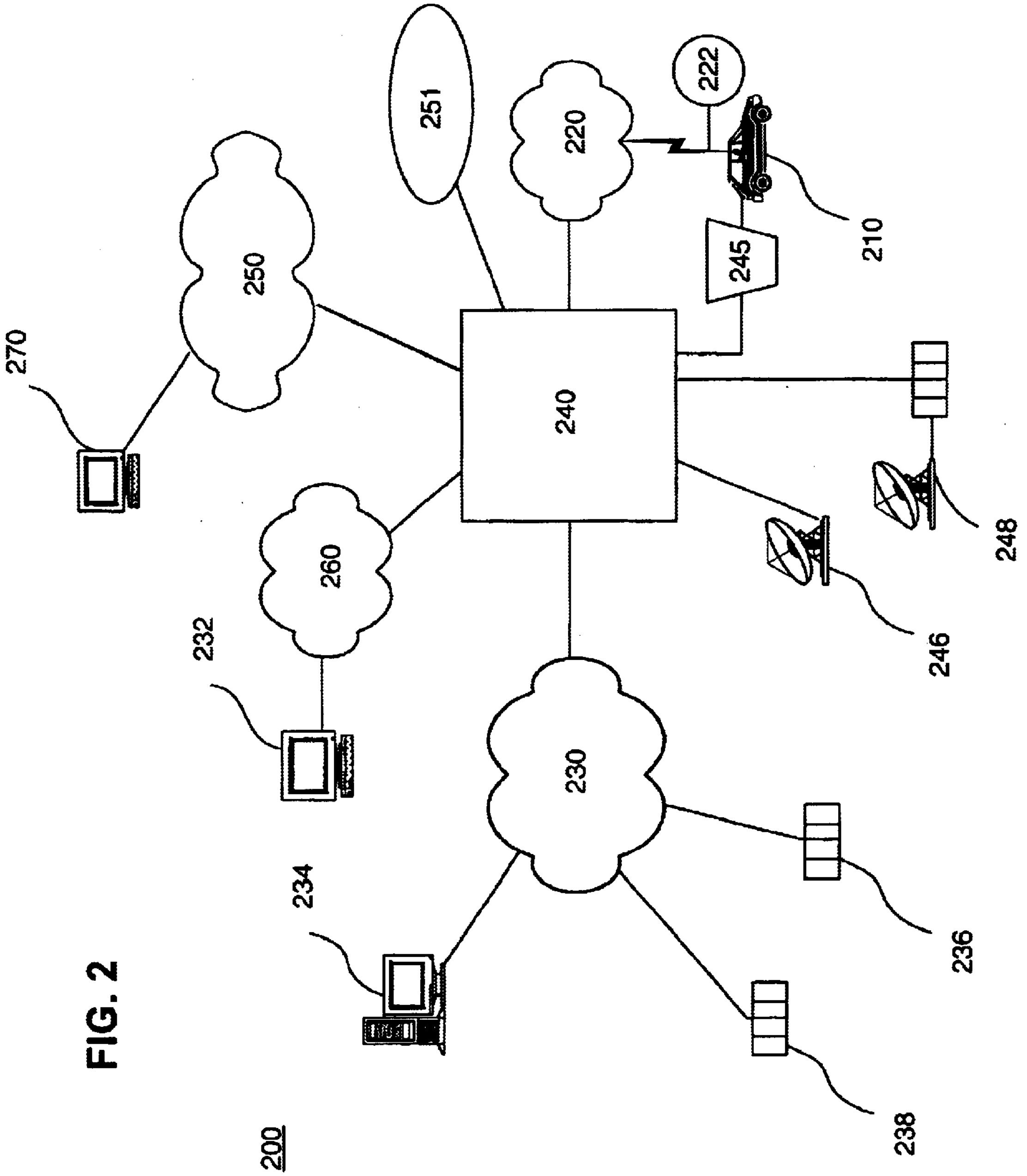
FIG. 2 is a schematic diagram of another embodiment of a system for generating navigation information for a vehicle in accordance with the present invention.

FIG. 2 shows another embodiment of a system for providing services to a vehicle in accordance with the present invention at 200. Vehicle-directed service system 200 may include a subscriber 210 and a service management application 240. In the embodiment shown in FIG. 2, the service management subsystem may be in connection with a communication network 230, such as the Internet. Service management application 240 may also be in communication with service applications or other service management subsystems. For example, in FIG. 2, service management subsystem 240 is also in communication with a subsystem for processing route information shown at 251. Service management subsystem 240 may also be in communication with a web-based service application or other web-based service management systems or web servers. For example, in FIG. 2, service management application 240 is in communication with a web channel 260.

In one embodiment of the invention, service management application may include an in-vehicle component 245. This in-vehicle component may be located in, or on or may be in communication with vehicle client 210. In one embodiment of the invention, the in-vehicle component 245 may install a software algorithm, based on the type of call originated through a voice command, in order to optimize the talk path to subscriber management application 240. System 200 may also allow the subscriber to connect to a live administrator or advisor 270 through a spoken command acknowledged through the subscriber management application 240 voice user interface (VUI).

In one embodiment of the invention, subscriber 210 may have VUI access 222 through a PSTN 220. This may serve as the primary end user interface to service management application 240. This VUI access may allow subscribers in their vehicles equipped in accordance with the present invention to access a variety of services. For example, subscribers 210 may request route information or travel information or may provide information about their route, using voice commands in a conversational manner. Furthermore, the subscriber may have the ability to interrupt or suspend the session if required. In one embodiment of the invention, connections are made to the service management application 240 through the public telephone system. In one embodiment of the invention, subscriber 210 may gain audio access to subscriber management application 240 by activating an in-vehicle speech recognition application. This speech recognition application may allow the subscriber to place hands-free cell phone calls.

Subscriber 210 may also have graphical user interface (GUI) access 232 through a communication network 230, such as the Internet. Such an interface may allow subscribers to access a variety of Internet and communication network-based services in accordance with the present invention. For example, subscriber 210 may access email via this interface. In one embodiment of the invention, subscribers connect to the service management application 240 through the Internet 230 using'standard Web browsers.

Subscriber 210 may also have GUI access through a web channel 260. This interface may be used by subscribers to access a variety of services. For example, subscriber 210 may maintain one or more user profiles using web channel 260. Subscriber 210 may also set up user-related rules such as e-mail consolidation and filtering rules. This interface may also be used to access selected content services. Vehicle data, such as diagnostic codes and messages, can be consolidated and displayed using web channel 260. As with other components of system 200, information entered or accessed via web channel 260 may then be incorporated into new products and services for presentation over other channels in communication with service management subsystem 240. The subscribers 210 may connect to the web channel 260 using standard Web browsers. In one embodiment of the invention, standard web channel software interacts with the service management application to update subscriber profiles and/or to obtain information of interest. In one embodiment of the invention, the web channel 260 interface uses a dedicated connection to the service management system 240.

System 200 may also include one or more administrators 270. Administrator 270 may use GUI access to manage service management system 240 and information related to system 200. Administrator 270 may be, for example, a live advisor available to advise subscriber 210. Administrator 270 may also be, for example, an individual maintaining or administering service management subsystem 240. In one embodiment of the invention, administrator 270 accesses service management subsystem 240 via subscriber management subsystem 250. For example, administrator 270 may send configuration and subscriber information to service management system 240. Administrator 270 may also receive notifications of interesting events within system 200. In one embodiment of the invention, subscriber management subsystem 250 uses a dedicated connection between administrator 270 and service management system 240.

As seen in FIG. 2, system 200 may also include one or more message servers 234. These messages may be, for example, voice or text or e-mail mail messages. In one embodiment of the invention, message servers 234 communicate with service management application 240 via Internet 230. Thus, subscribers 210 may receive incoming email messages from, and send outgoing e-mail messages to, external mail transport agents using any suitable messaging protocol as is well known in the art. Message servers 234 may also be used to retrieve subscribers' e-mail from outside mail storage servers for consolidation into their e-mail accounts connected to system 200.

As seen in FIG. 2, system 200 may also include one or more news and or sports feeds 236. In one embodiment of the invention, feeds 236 are provided by a network news content provider. Feeds 236 may be used to receive and store audio news and sports stories for playback to interested subscribers 210. The primary interface between the speech channel and news content provider 236 may be via the Internet 230. In one embodiment of the invention, a satellite feed 246 serves as a backup mechanism.

As seen in FIG. 2, system 200 may also include one or more weather services 248. In one embodiment of the invention, the services are provided by any suitable weather reporting service. Weather services 248 may be used to receive and store regional and local weather information for playback to interested subscribers 210. Furthermore, the weather content can be delivered based on the vehicle location by coordinating the weather zone with the vehicle GPS location. The weather service 248 and/or content feed may be co-located with the service management system 240.

System 200 may also include one or more finance services 238. For example, stock quotes may be provided to the subscriber. Any suitable finance technology may be, used to provide these services to interested subscribers. In the embodiment of FIG. 2, the finance information is obtained at the time of the request through Internet attached content sources or dedicated connections. 230 as is known in the art.

System 200 may also include other services to be delivered in addition to news, weather, sports and finance services as described above. For example, yellow pages listings, special interest content (e.g., movie or restaurant reviews), content related to the location of the vehicle (e.g. travel profiles of nearby tourist attractions) or content related to navigation of the vehicle may all be delivered via system 200.

Figure 3:
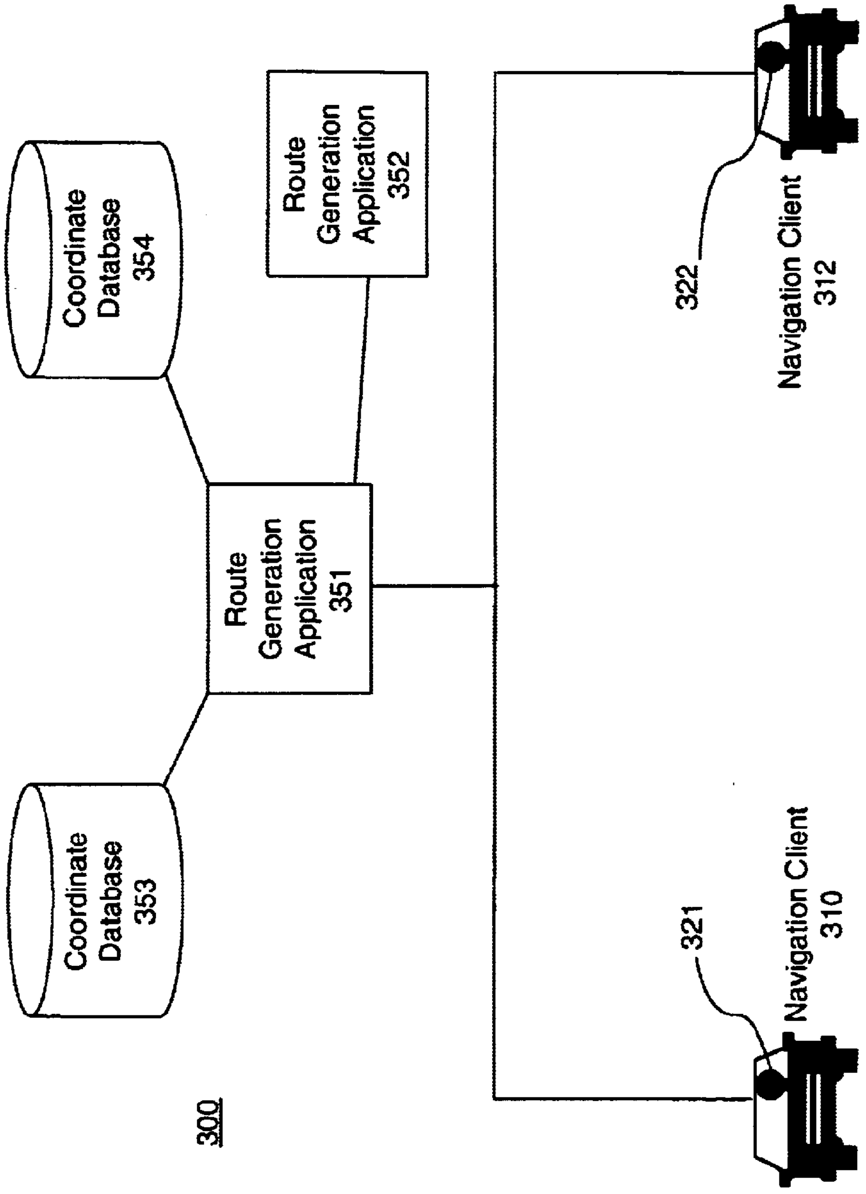
FIG. 3 is a schematic diagram of one embodiment of a navigation subsystem in accordance with the present invention.

FIG. 3 shows one embodiment of a navigation system in accordance with the present invention at 300. Navigation system 300 may include one or more navigation clients 310, 312. Each navigation client 310, 312 may have an in-vehicle navigator 321, 322. Navigation system 300 may also include one or more route generation applications 351, 352. Navigation system 300 may also include one or more coordinate databases 353, 354.

Navigation clients 310, 312 may be one or more vehicle clients as described above.

In-vehicle navigator 321, 322 may be any suitable component of navigation client 310, 312 which may be used to navigate vehicle client 310, 312. For example, in-vehicle navigator 321, 322 may be a driver. Alternatively, in-vehicle navigator 321, 322 may be an automatic system for navigating vehicle 310, 312.

Route generation applications 351, 352 may be any suitable application for calculating maneuver lists of directions between one or more locations. For example, route generation applications 351, 352 may be any suitable software or hardware programs for managing or calculating routes, portions of route or route coordinates. Route generation applications may include or be able to calculate routes from navigation client's current location to private residences, businesses or recreational facilities. In one embodiment of the invention, route generation applications 351, 352 are in communication with coordinate databases 353, 354.

Route generation applications 351, 352 may generate navigation information in any suitable manner. For example, route generation applications 351, 352 may generate routes using geocoding. That is, the application 351, 352 determines a corresponding latitude and longitude based on an input navigation address. Alternatively, route generation applications 351, 352 may generate routes using reverse geocoding. That is, the application 351, 352 determines a corresponding navigation address based on input latitude and longitude coordinates.

Coordinate databases 353, 354 may be any suitable databases for storing such location coordinates as latitude and longitude of a variety of locations. These locations may be, for example, points of interest. Coordinate databases 353, 354 may also be a database of street addresses. Coordinate databases 353, 354 may also be a database of routes between points.

Figure 4A:
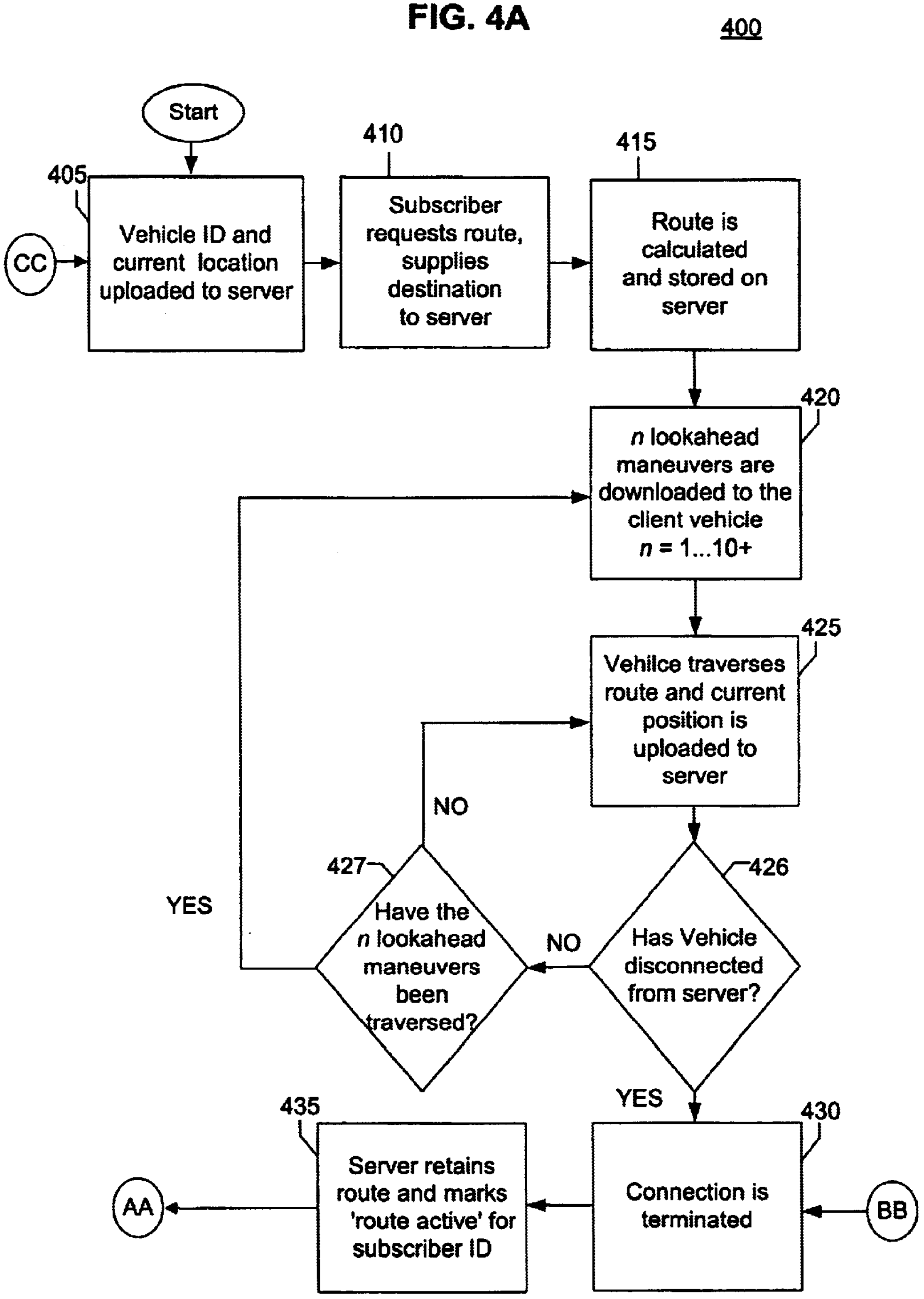
FIG. 4 is a flowchart demonstrating a preferred embodiment of a method for providing route instructions in accordance with the present invention.
Figure 4B:
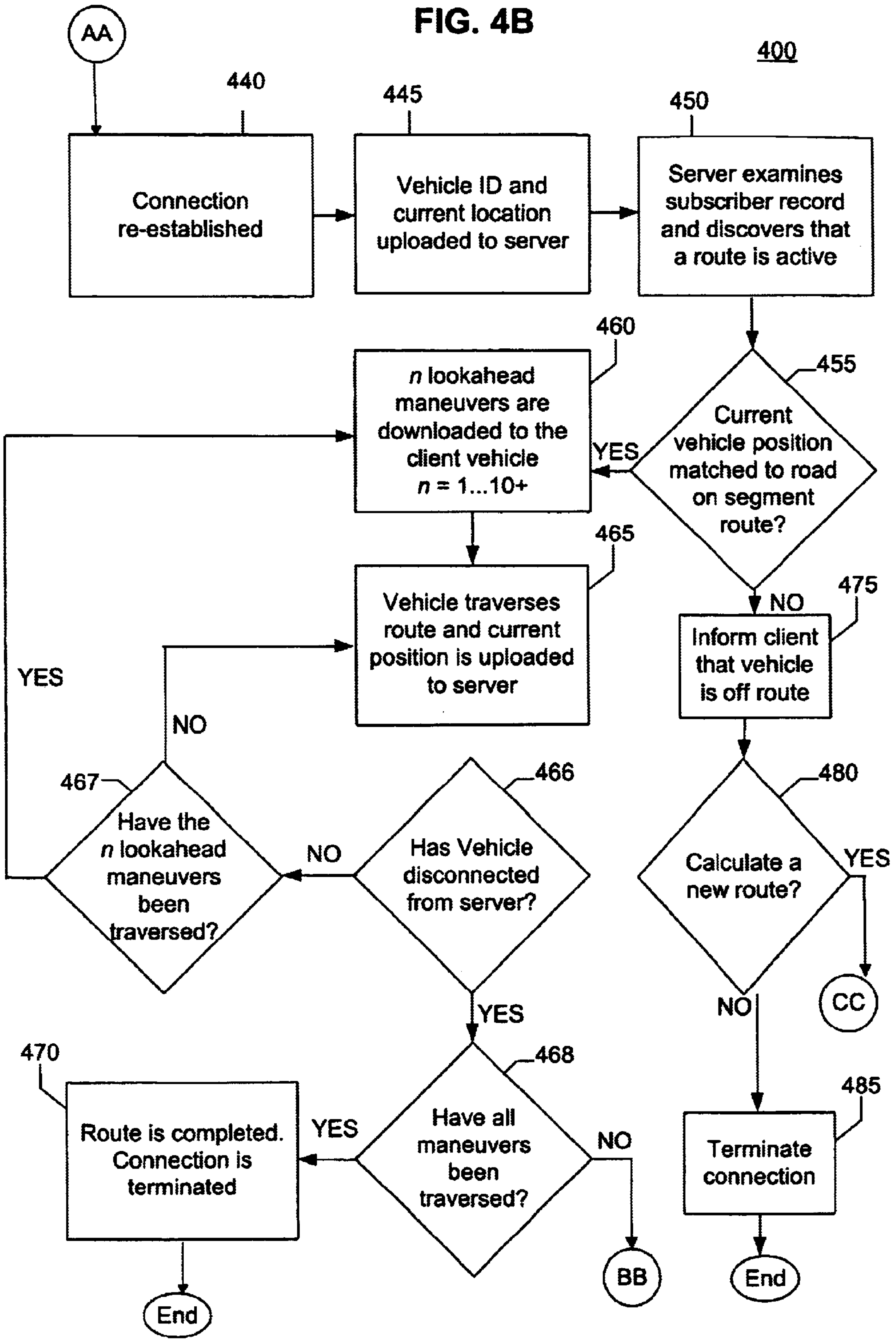

FIGS. 4A–4B show one embodiment of a method of providing route instructions in accordance with the present invention at 400. The client vehicle 10, 210 establishes communication with a server 40, 240 through the at least one communication network 30, 230 and transmitting over the at least one carrier system 20. The client vehicle 10, 210 may provide the server 40, 240 with a client vehicle ID 405 for tracking purposes and to determine client subscriber services and preferences. At this point, the server may determine the client's current location 405. In one embodiment, the vehicle's current location may be provided through verbal communication with a live administrator 270, or via the world wide web 260 with the use of a computer or other device capable of accessing the web. In another embodiment, the vehicle's location may be determined through the use of a global positioning system 246 or dead reckoning system. The client 10, 210 may then supply the server 40, 240 with a destination and request a route to reach the destination 410. At least one route generation application 50, 251, 351, 352 may generate a suitable route based on the client vehicle's current location and destination 415. The route may then be stored on the server 415 and associated with the vehicle subscriber's ID.

At least one maneuver instruction associated with the route may be downloaded to the client vehicle 420. The number of maneuvers downloaded to the vehicle may be based on factors such as road speed, road density, road type, and other road related criteria, as well as user preference. It is not required that the entire route be downloaded to the vehicle at the same time. After the at least one maneuver instruction has been received by the vehicle 420, the navigator 321, 322 may begin to traverse the route by following the at least one maneuver instruction provided to him 425. At this point, the vehicle navigator may decide to terminate communication 430 with the server 40, 240. The client vehicle is not required to maintain constant communication with the server throughout the entire route, and the communication channel and device may then be available for other use.

As the client vehicle traverses the route, its location may periodically be uploaded to the server for the monitoring of progress along the route 425. The server may track the vehicle's location as long as the vehicle is in communication with the server. As the downloaded maneuvers are traversed by the vehicle 427, further maneuver instructions pertaining to the route may be downloaded to the vehicle. A threshold limit may determine the number of allowed remaining maneuvers to traverse before downloading more maneuvers to the vehicle. This threshold limit may be based on factors such as road speed, road density, road type, and other road related criteria, as well as user preference.

The vehicle navigator may decide to terminate communication with the server at any time 426, 430. Communication between the client vehicle and server may resume as long as the vehicle navigator desires, or until the channel is disrupted. Upon termination of communication, the server may designate the vehicle's route as being 'active' or 'in progress' 435. Upon reestablishment of communication 440 between the vehicle and server, the client vehicle's subscriber ID and current location may be uploaded to the server 445. The server 40, 240 may then examine the subscriber record and check for an active route 450. Upon discovering an active route, the server may determine the vehicle's current location and attempt to match it to astored road segment on the route 455. Upon matching the vehicle's current position to a road segment on the stored route, the server may download further maneuver instructions to the vehicle 460. As the vehicle traverses the route, its current location may be periodically uploaded to the server 465 while the vehicle is in communication with the server. As the downloaded maneuver instructions are traversed by the vehicle 467, further instructions may be downloaded to the vehicle. In the event that the vehicle strays off route, the vehicle's current location may not match a road segment on the stored route. In this situation, the client may be informed that the vehicle is off route 475. The client may be asked whether a new route should be determined to reach the destination from the vehicle's current location 480. If the client requests a new route, the entire process may begin again. If the client requests no new route, the connection may be terminated 485. The communication channel may be terminated or left open for other services at this point.

The vehicle navigator may again decide to terminate communication with the server 466 while the route is traversed. The cycle of termination of communication and reestablishment of communication in order to download more maneuver instructions 468 may continue until the route is completed or cancelled 470.

The number of maneuver instructions downloaded to the vehicle 420, 460 may be based on environment factors such as road speed, road density, road type, and other road related criteria, as well as user preference. For example, several maneuver instructions may be downloaded to a vehicle currently located in an area with high road density, such as in a large city, where several maneuvers are required in a short time frame. However, a vehicle currently located on an isolated rural highway with few intersections or off ramps within a long distance, may immediately require very few maneuver instructions 321, 322.

The server 40, 240 and route application 50, 251, 351, 352 may be responsible for making the decision to download more maneuver instructions to the client vehicle while in communication with the server. Thereby eliminating the need to install and maintain the extra hardware and software in the client vehicle. While communication is not established between the vehicle and server, it may be the vehicle navigator's responsibility to reestablish communication with the server in order to download further maneuver instructions. The decision by the server to download further maneuvers instructions to the vehicle 460 may be based on environment factors such as road speed, road density, road type, and other road related criteria, as well as time, distance traveled, and user preference. In general, the decision to download further maneuver instructions may be based on how soon the vehicle may traverse the route segments before reaching the next maneuver point.

While the embodiments of the present invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A method of providing route instructions to a mobile vehicle, comprising:

establishing communication between a client vehicle and a server;

providing the server with a current location of the client vehicle;

providing the server with a destination of the client vehicle;

determining a route based on the current location and the destination;

storing the route on the server;

downloading at least one maneuver associated with the route from the server to the client vehicle;

terminating communication between the client vehicle and the server after the at least one maneuver is downloaded;

designating the route as in progress on the server upon the termination of communication between the client vehicle and the server;

reestablishing communication between the client vehicle and the server;

redetermining the current location of the client vehicle upon reestablishing communication; and downloading at least one additional maneuver associated with the route after reestablishing communication.

2. The method of claim 1 further comprising providing a client vehicle ID and storing the route associated with the client vehicle ID on the server.

3. The method of claim 1 wherein a number of maneuvers downloaded is based on at least one vehicle environment factor.

4. The method of claim 3 wherein the at least one vehicle environment factor is selected from a list consisting of road density, traffic density, and user preferences.

5. The method of claim 1 wherein reestablishing communication is based on client vehicle positional data.

6. The method of claim 1 further comprising:

searching the server for a route that has been designated as in progress.

7. The method of claim 6 further comprising:

matching the current vehicle location to a road segment of the determined route.

8. The method of claim 1 further comprising:

downloading at least one additional maneuver to the client vehicle as the client vehicle traverses the determined route.

9. A system for providing route instructions to a mobile vehicle, comprising:

means for establishing communication between a client vehicle and a server;

means for providing the server with the current location of the client vehicle;

means for providing the server with a destination of the client vehicle;

means for determining a route based on the current location and the destination, means for storing the route on the server;

means for downloading at least one maneuver associated with the route from the server to the client vehicle;

means for terminating communication between the client vehicle and the server after the at least one maneuver is downloaded;

means for designating the route as in progress on the server upon the termination of communication between the client vehicle and the server, means for reestablishing communication between the client vehicle and the server;

means for redetermining the current location of the client vehicle upon reestablishing communication; and means for downloading at least one additional maneuver associated with the route after reestablishing communication.

10. The system of claim 9 further comprising means for providing a client vehicle ID and storing the route associated with the client vehicle ID on the server.

11. The system of claim 9 further comprising:

means for searching the server for a route that has been designated as in progress.

12. The system of claim 11 further comprising:

means for matching the current vehicle location to a road segment of the determined route.

13. The system of claim 9 further comprising:

means for downloading at least one additional maneuver to the client vehicle as the client vehicle traverses the determined route.

14. A computer usable medium for providing route instructions to a mobile vehicle, comprising:

computer readable code to receive a current location of the client vehicle at the server;

computer readable code to receive a destination of the client vehicle at the server;

computer readable code to determine a route based on the current location and the destination;

computer readable code to store the route on the server;

computer readable code to receive at least one maneuver associated with the route from the server at the client vehicle;

computer readable code to designate the route as in progress on the server upon termination of communication between the client vehicle and the server;

computer readable code to redetermine the current location of the client vehicle upon reestablishing communication between the client vehicle and the server; and computer readable code to download at least one additional maneuver associated with the route after reestablishing communication.

15. The computer usable medium of claim 14 further comprising computer readable code to receive a client vehicle ID at the server and store the route associated with the client vehicle ID on the server.

16. The computer usable medium of claim 14 further comprising:

computer readable code to determine a number of at least one maneuver to download based on at least one vehicle environment factor.

17. The computer usable medium of claim 16 wherein the at least one vehicle environment factor is selected from a list consisting of road density, traffic density, and user preferences.

18. The computer usable medium of claim 14 further comprising:

computer readable code for reestablishing communication based on client vehicle positional data.

19. The computer usable medium of claim 14 further comprising:

computer readable code for searching the server for a route that has been designated as in progress.

20. The computer usable medium of claim 19 further comprising:

computer readable code for matching the current vehicle location to a road segment of the determined route.

21. The computer usable medium of claim 14 further comprising:

computer readable code for downloading at least one additional maneuver to the client vehicle as the client vehicle traverses the determined route.

* * * * *